Figure 1:
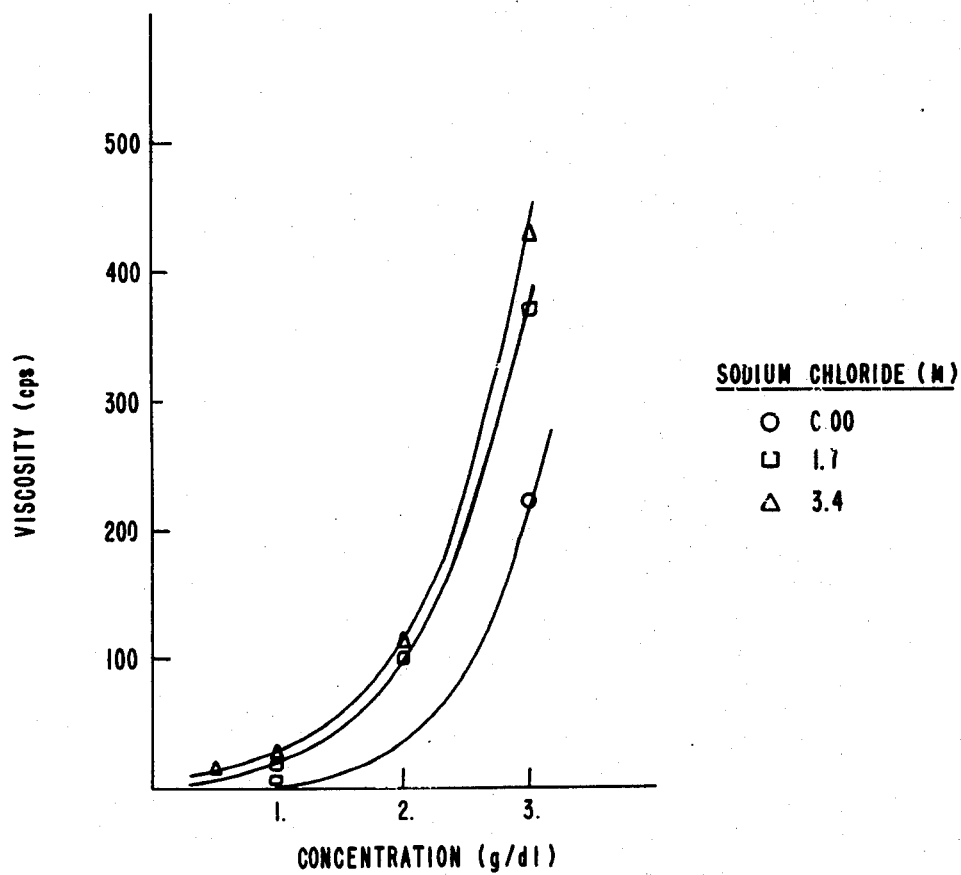
Figure 2:
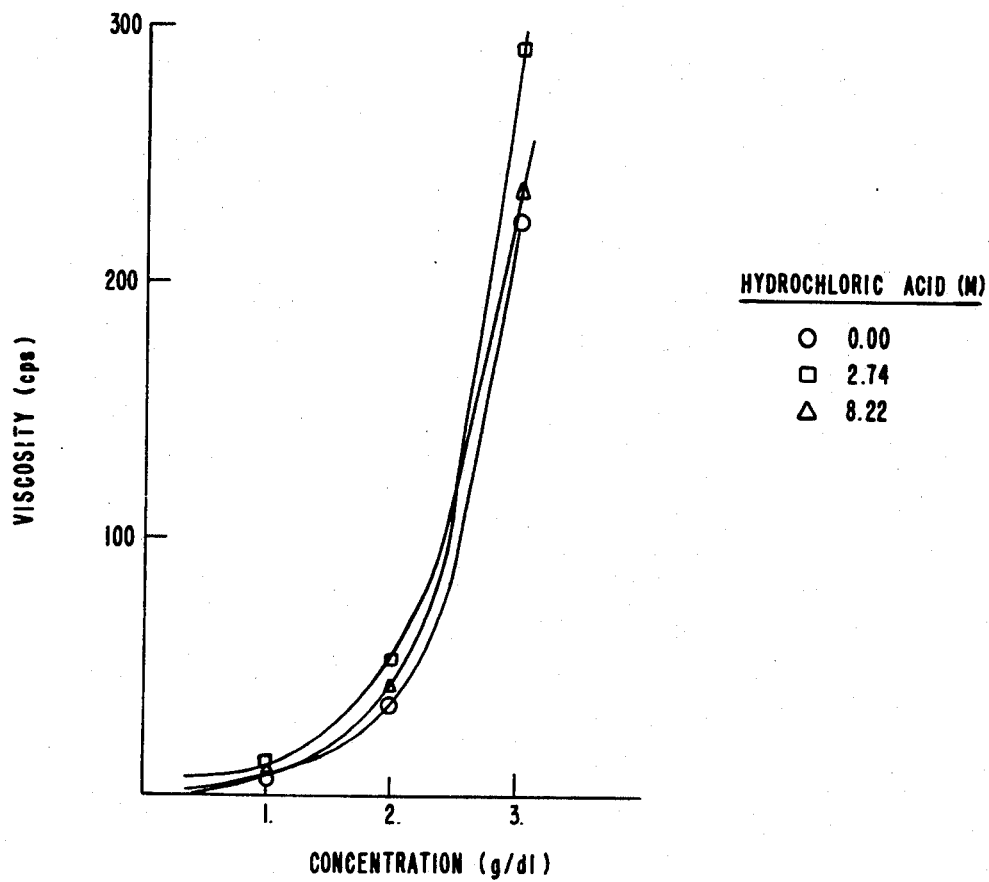
Figure 3:
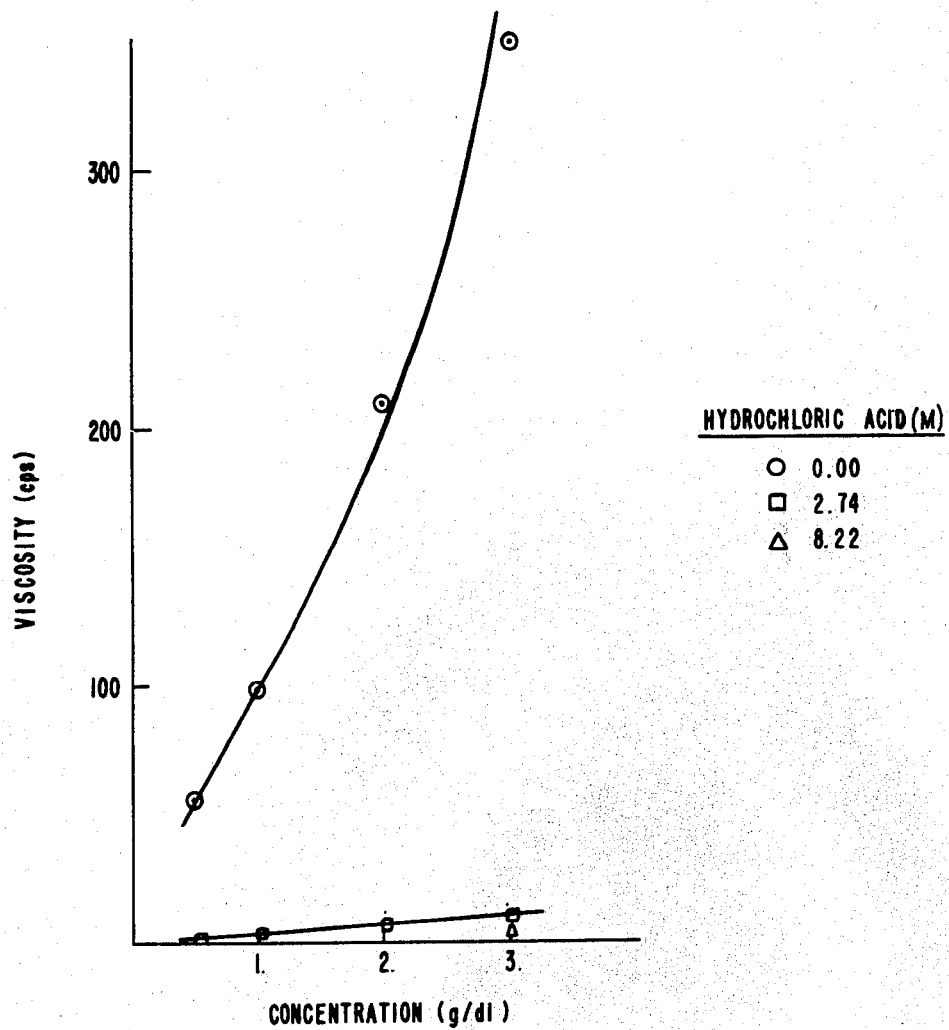
Figure 4:
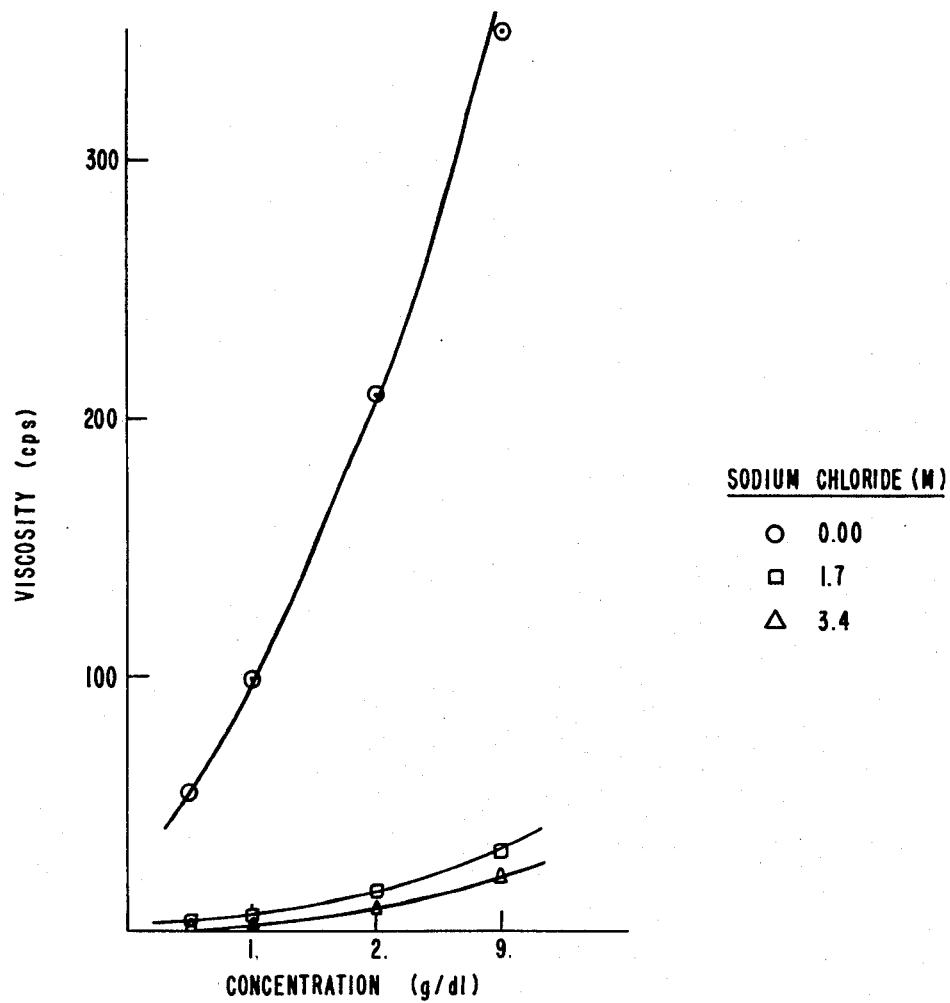

United States Patent [19]

Peiffer et al.

[11] Patent Number: 4,461,884

[45] Date of Patent: Jul. 24, 1984

[54] INTRAMOLECULAR POLYMERIC COMPLEXES-VISCOSIFIERS FOR ACID, BASE AND SALT (AQUEOUS) SOLUTIONS

[75] Inventors: Dennis G. Peiffer, East Brunswick; Robert D. Lundberg, Bridgewater, both of N.J.; S. Richard Turner, Rochester, N.Y.

[73] Assignee: Exxon Research and Engineering Co., Florham Park, N.J.

[21] Appl. No.: 478,657

[22] Filed: Mar. 25, 1983

[51] Int. Cl.³ .................... C08F 30/04; C08F 130/04; C08F 230/04
[52] U.S. Cl. .................................. 526/240; 526/287; 526/307
[58] Field of Search .................. 526/240, 287, 307

[56] References Cited

U.S. PATENT DOCUMENTS 4,075,183 2/1978 Kawakami et al. ............... 526/307
4,115,339 9/1978 Restaino ........................... 526/240

FOREIGN PATENT DOCUMENTS 1181914 11/1964 Fed. Rep. of Germany ...... 526/240

Primary Examiner—Joseph L. Schofer
Assistant Examiner—Peter F. Kulkosky
Attorney, Agent, or Firm—Richard E. Nanfeldt

[57] ABSTRACT

The present invention relates to improved viscosification agents for a variety of aqueous solutions which comprise a family of intramolecular polymeric complexes (i.e., polyampholytes) which are terpolymers of acrylamide/metal styrene sulfonate/methacrylamidopropyltrimethylammonium chloride (MAPTAC). The metal styrene sulfonate is an anionic monomer, while MAPTAC is cationically charged. These acrylamide-based polyampholytes have approximately 1 to about 50 mol % of the anionic monomer and approximately 1 to about 50 mole % of the cationic moiety present within the macromolecular structure. These groups are not necessarily present in an equimolar charge ratio. The excess undissociated charge allows for facile dispensability or solubility of the polyampholytes into fresh water.

10 Claims, 5 Drawing Figures

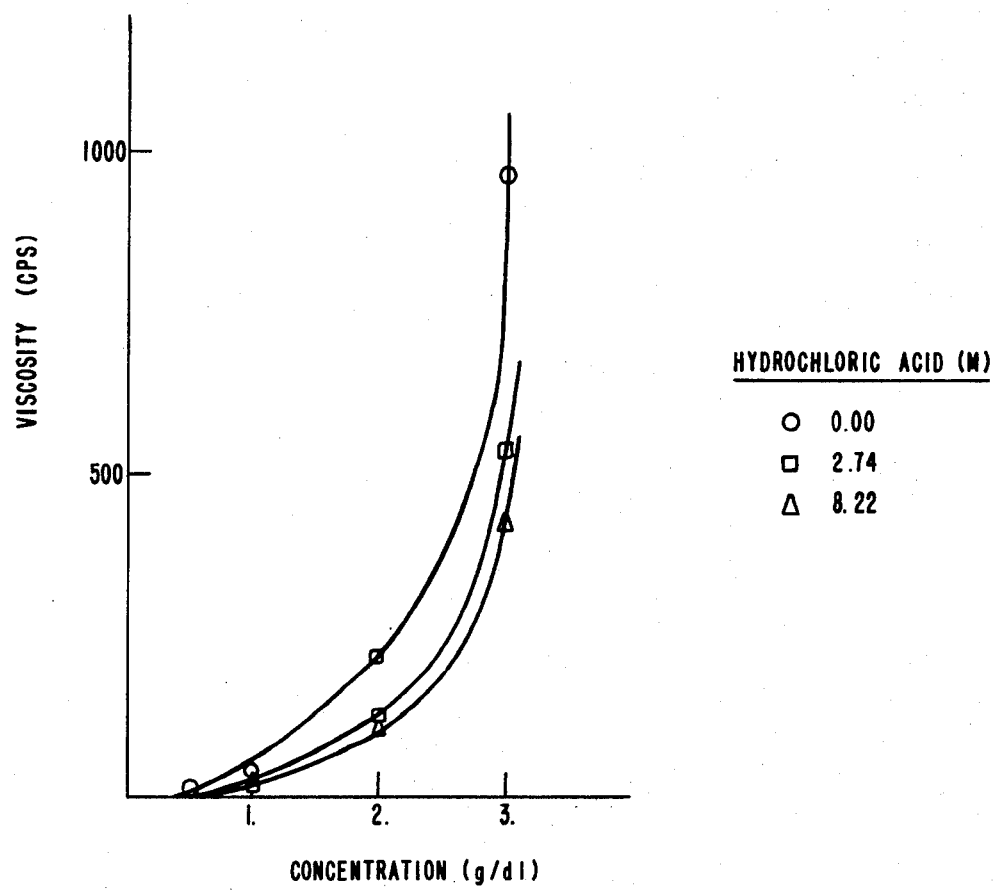

INTRAMOLECULAR POLYMERIC COMPLEXES-VISCOSIFIERS FOR ACID, BASE AND SALT (AQUEOUS) SOLUTIONS

FIELD OF THE INVENTION

The present invention relates to improved viscosification agents for a variety of aqueous solutions which comprise a family of intramolecular polymeric complexes (i.e., polyampholyte) which are terpolymers of acrylamide/metal styrene sulfonate/methacrylamidopropyltrimethylammonium chloride (MAPTAC).

The metal styrene sulfonate is an anionic monomer, while MAPTAC is cationically charged. These acrylamide-based polyampholytes have approximately 1 to about 50 mole % of the anionic monomer and approximately 1 to about 50 mole % of the cationic moiety present within the macromolecular structure. These groups are not necessarily present in an equimolar charge ratio. The excess undissociated charge allows for facile dispensability for solubility of the polyampholytes into fresh water.

BACKGROUND OF THE INVENTION

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in size of the polymer chain will produce a corresponding enhancement in the viscosity of the solution. This effect is maximized, when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to aqueous systems, polyelectrolytes are very useful and the most commonly used materials; however, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continues to shrink.

The instant invention discloses that intramolecular polymeric complexes (i.e., polyampholytes), composed of cationic, anionic and neutral monomeric units, can be useful in viscosifying aqueous solution systems. The former two moieties need not be present in an equimolar amount. More importantly, these polymeric materials possess higher viscosity in acid, base or salt solutions than in the corresponding fresh water system. Even more interesting is that these polymeric materials show a corresponding viscosity enhancement as the concentration of the dissolved acid, base or salt is increased. These viscosity results are unexpected since the general tendency of homogeneously charged macromolecules in these types of aqueous solutions shows a marked decrease in thickening efficiency.

Typical water soluble monomers incorporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.

Nonionic: (N,N-dimethyl)acrylamide, hydroxyethyl(meth)acrylate, alkyl substituted acrylamides,(meth)acrylates, N-vinyllactanes (e.g., n-vinyl-2-pyrrolidone), and the like.

These monomers possess the appropriate water solubility for polymerization to take place.

Salamone et al., of the University of Lowell (Massachusetts), have investigated ampholytic polymers. They have studied the solution properties of divinylic cationic-anionic monomer pairs and also cationic-anionic monomer pairs with a neutral comonomer. This latter group of materials contains styrene as the neutral comonomer (J. Polym. Sci. Al, 18, 2983 [1980], which can be incorporated into the ampholytic macromolecular structure through both solution or emulsion polymerization schemes. Apparently, other neutral vinylic monomers (i.e., acrylamide) were also polymerized (Gordon Research Conference - 1981); but as of the present time, reports of this work have not been published in the scientific literature. However, in all of Salamone's work, detailed descriptions of this synthesis is reported. In all instances, the polymerization of tha anionic-cationic monomeric species occurred via an "ion-pair comonomers that have no nonpolymerizable counter-ions present" (J. Polym. Sci. - Letters, 15, 487 [1977]). The physical and chemical properties of these ion-pair comonomers are quite different than the individual ions (J. Polym. Sci. - Letters, 15, 487 [1977]).

Excess dissociable charges are not present within these polymeric materials.

SUMMARY OF THE INVENTION

The present invention relates to improved viscosification agents for an aqueous solution which can contain high concentrations of acids, bases or salts. Typically, the viscosification agents are intramolecular polymeric complexes (i.e., polyampholytes) which are formed by a free radical terpolymerization of acrylamide monomer, sodium styrene sulfonate monomer and methacrylamidopropyltrimethylammonium chloride monomer, wherein the formed water soluble terpolymers have the formula:

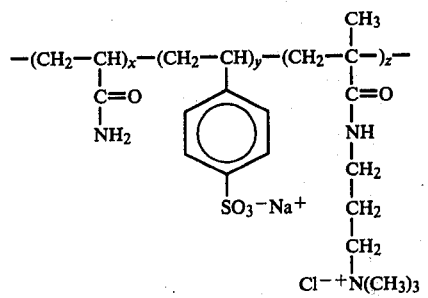

wherein x is about 40 to about 98 mole %, more preferably about 50 to about 95 mole %, and most preferably about 80 to about 90 mole %, y is about 1 to about 50 mole %, more preferably about 2 to about 20 mole %, and most preferably about 5 to about 10 mole %; and z is about 1 to about 50 mole %, more preferably about 2 to about 20 mole %, and most preferably about 5 to about 10 mole %, wherein y and z are less than 60 mole %. These ionic groups are not necessarily present in an equimolar charge ratio, since the excess undissociated charge allows for facile dispensibility of the polyampholytic into fresh water.

GENERAL DESCRIPTION

The instant invention describes a new class of terpolymers which are improved viscosification agents for aqueous solutions containing acid base, or salt. Typically, these terpolymers are formed by a free radical terpolymerization process in an aqueous medium of an acrylamide monomer, a sodium styrene sulfonate monomer and a methacrylamidopropyltrimethylammonium chloride monomer. The resultant water soluble terpolymer has the formula:

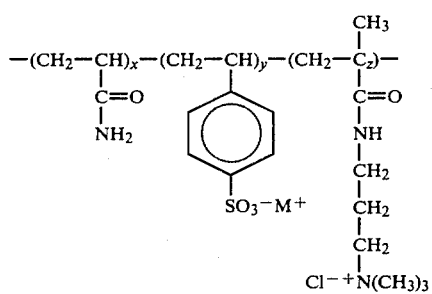

wherein x is about 40 to about 98 mole %, more preferably about 50 to about 95 mole %, and most preferably about 80 to about 90, y is about 1 to about 50 mole %, more preferably about 2 to about 20 mole %, and most preferably about 5 to about 10 mole %, and z is about 1 to about 50 mole %, more preferably about 2 to about 20, and most preferably about 5 to about 10, wherein y and z are less than 60 mole % and M is an amine or a metal cation selected from the group consisting of aluminum, iron, lead, Groups IA, IIA, IB and IIB of the Periodic Table of Elements.

The molecular weight, as derived from intrinsic viscosities, for the terpolymers of acrylamide/sodium styrene sulfonate/methacrylamidopropyltrimethylammonium chloride is about $10^3$ to about $5 \times 10^6$, more preferably about $10^4$ to about $2 \times 10^6$ and most preferably about $10^5$ to about $10^6$. The means for determining the molecular weights of the water soluble terpolymers from the viscosity of solutions of the terpolymers comprises the initial isolation of the water soluble terpolymers, purification and redissolving the terpolymers in water to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

The water soluble terpolymers of acrylamide/sodium styrene sulfonate/methacrylamidopropyltrimethylammonium chloride are formed by a conventional free radical terpolymerization in an aqueous medium which comprises the steps of forming a reaction solution of acrylamide monomer, sodium styrene sulfonate monomer and methacrylamidopropyltrimethylammonium chloride monomer (50 wt. % solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding sufficient acid to the reaction solution to adjust the pH of the reaction solution to about 4.5 to about 5.0; heating the reaction solution to at least 55° C. while maintaining the nitrogen purge; adding sufficient free radical initiator to the reaction solution at 55° C. to initiate terpolymerization of the acrylamide monomer, the sodium styrene sulfonate monomer, and the methacrylamidopropyltrimethylammonium chloride monomer; terpolymerizing said monomers of acrylamide, sodium styrene sulfonate and methacrylamidopropyltrimethylammonium chloride at a sufficient temperature and for a sufficient period of time to form said water soluble terpolymer; and recovering said water soluble terpolymer from said reaction solution.

The total concentration of monomers in the water is about 1 to about 40 grams of total monomer per 100 grams of water, more preferably about 5 to about 30 and most preferably about 10 to about 20. Terpolymerization of the acrylamide monomer, sodium styrene sulfonate monomer, and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, and most preferably about 4 to about 8.

A suitable method of recovery of the formed water soluble terpolymer from the aqueous reaction solution comprises precipitation in acetone, methanol, ethanol and the like.

Suitable free radical initiators for the free radical terpolymerization of the acrylamide monomers, the sodium styrene suflonate monomer, and the methacrylamidopropyltrimethylammonium chloride monomer are selected from the group consisting of potassium persulfate, ammonium persulfate, benzoyl peroxide, hydrogen peroxide, azobisisobutyronitrile, and the like. The concentration of the free radical initiator is about 0.001 to about 2.0 grams of free radical initiator per 100 grams of total monomer, more preferably about 0.01 to about 1.0 and most preferably about 0.05 to about 0.1.

It should be pointed out that neither the mode of polymerization (solution, suspension, or emulsion polymerization technique and the like), nor the initiation is critical, provided that the method or the products of the initiation step does not inhibit production of the polyampholyte or chemically modify the initial molecular structure of reacting monomers.

Typical water soluble monomers incorporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium methosulfate, 2-acrylamido-2-methylpropyltrimethylammonium chloride, vinylbenzyltrimethylammonium chloride, and the like.

Nonionic: (N,N-dimethyl)acrylamide, hydroxyethyl(-meth)acrylate, alkyl substituted acrylamides,(meth)acrylates, N-vinyllactanes (e.g., n-vinyl-2-pyrrolidone), and the like.

These monomers possess the appropriate water solubility for polymerization to take place.

DESCRIPTION OF THE PREFERRED EMODIMENTS

The following examples illustrate the present invention, without; however, limiting the same hereto.

EXAMPLE 1

Into a 1 liter, 4-necked flask was added:
13.8 g. MAPTAC (50% solution in water),
40.0 g. acrylamide,
6.44 g. sodium styrene sulfonate, and
300 ml. distilled water The pH of the solution was adjusted to 4.5 to 5.0 with 20% phosphonic acid solution. The solution was purged with nitrogen gas for 1 hour to remove dissolved oxygen. As the nitrogen gas purging began, the solution was heated to 55° C. At this point, 0.1 g. potassium persulfate was added to the solution. After 4 hours, the polymer was precipitated from solution with acetone. Subsequently, the resulting polymer was washed several times with a large excess of acetone and dried in a vacuum oven at 60° C. for 24 hours.

Elemental analysis shows that this polyampholyte or intramolecular complex contains 90.5 mole % acrylamide, 1.86 mole % sodium styrene sulfonate and 7.64 mole % methacrylamidopropyltrimethylammoniumstyrene sulfonate complex.

EXAMPLE 2

Shown in Table I are representative data on the viscosity as a function of polymer concentration of a terpolymer composed of approximately 90.5 mole % acrylamide (AM), 7.64 mole % methacrylamidopropyltrimethylammonium styrene sulfonate complex and 1.86 mole % sodium styrene sulfonate (SSS). This polymer was synthesized by the free radical type polymerization in an aqueous solvent system as described in Example 1.

TABLE I

Rheological Properties of an Acrylamide-Based Polyampholyte in Fresh and Salt Water

| Polymer Concentration (g/dl) | Salt Concentration[a] (Molar) | Viscosity[b] (cps) |
|---|---|---|
| 0.5 | 0.0 | 5. |
| 1.0 | 0.0 | 15. |
| 2.0 | 0.0 | 35. |
| 3.0 | 0.0 | 225. |
| 0.5 | 1.7 | 15. |
| 1.0 | 1.7 | 25. |
| 2.0 | 1.7 | 100. |
| 3.0 | 1.7 | 370. |
| 0.5 | 3.4 | 25. |
| 1.0 | 3.4 | 35. |
| 2.0 | 3.4 | 115. |
| 3.0 | 3.4 | 430. |

[a]Sodium chloride.
[b]Measurements obtained on a Brookfield ® Viscometer at 12 RPM.

We note that the viscosity was measured in both fresh and salt (in this example, sodium chloride) water as the data in Table I shows. An important conclusion that can be drawn from the data is the marked viscosity enhancement (at all polymer levels) as the concentration of sodium chloride is increased. The viscosity (at 3 g/dl polymer level) has increased, approximately by a factor of a 2, with the addition of 3.4 M (i.e., 3.4 Molar) sodium chloride. Essentially similar results are observed in hydrochloric acid solutions (see Table II). That is, the viscosity of the terpolymer increases until a point is reached at very high acid levels where the viscosity drops slightly. This drop-off could be due to a slight compression of the expanded polymer chain by the high acid concentration. Even at these acid levels, the viscosity of the solution does not fall below the fresh water system.

TABLE II

Rheological Properties of an Acrylamide-Based Polyampholyte in Fresh and Acid Solutions

| Polymer Concentration (g/dl) | Acid Concentration[a] (Molar) | Viscosity[b] (cps) |
|---|---|---|
| 0.5 | 0.0 | 5. |
| 1.0 | 0.0 | 15. |
| 2.0 | 0.0 | 35. |
| 3.0 | 0.0 | 225. |
| 0.5 | 2.74 | 12. |
| 1.0 | 2.74 | 22. |
| 2.0 | 2.74 | 55. |
| 3.0 | 2.74 | 290. |
| 0.5 | 8.22 | 8. |
| 1.0 | 8.22 | 18. |
| 2.0 | 8.22 | 42. |
| 3.0 | 8.22 | 235. |

[a]Hydrochloric acid.
[b]Measurements obtained on a Brookfield ® Viscometer at 12 RPM.

A study of copolymers with either the cationic or anionic monomer units absent (i.e., homogeneously changed) would be informative in showing the necessity of having both charged species present within the polymer structure. Shown in Tables III and IV are viscosity concentration data at a sodium styrene sulfonate (SSS)/acrylamide copolymer (32.9 mole % SSS) in hydrochloric acid and sodium chloride solutions. The viscosity in fresh water is high at all polymer levels, but falls dramatically with the addition of acid or salt. This behavior is in marked contrast with the viscosity enhancement of the terpolymer.

TABLE III

Rheological Properties of an Acrylamide-Sodium Styrene Sulfonate Copolymer in Fresh and Acidified Water

| Polymer Concentration (g/dl) | Acid Concentration (M) | Viscosity[a] (cps) |
|---|---|---|
| 0.5 | 0.0 | 55. |
| 1.0 | 0.0 | 95. |
| 2.0 | 0.0 | 215. |
| 3.0 | 0.0 | 350. |
| 0.5 | 2.74 | 2 |
| 1.0 | 2.74 | 5 |
| 2.0 | 2.74 | 8 |
| 3.0 | 2.74 | 12 |
| 0.5 | 8.22 | 1 |
| 1.0 | 8.22 | 3 |
| 2.0 | 8.22 | 5 |
| 3.0 | 8.22 | 8 |

[a]Measurements obtained on a Brookfield ® Viscometer at 12 RPM.

TABLE IV

Rheological Properties of an Acrylamide-Sodium Styrene Sulfonate Copolymer in Fresh and Salt Water

| Polymer Concentration (g/dl) | Salt Concentration (M) | Viscosity[a] (cps) |
|---|---|---|
| 0.5 | 0.0 | 55. |
| 1.0 | 0.0 | 95. |
| 2.0 | 0.0 | 215. |
| 3.0 | 0.0 | 350. |
| 0.5 | 1.7 | 5 |

TABLE IV-continued
Rheological Properties of an Acrylamide-Sodium Styrene Sulfonate Copolymer in Fresh and Salt Water

| Polymer Concentration (g/dl) | Salt Concentration (M) | Viscosity[a] (cps) |
|---|---|---|
| 1.0 | 1.7 | 10 |
| 2.0 | 1.7 | 18 |
| 3.0 | 1.7 | 35 |
| 0.5 | 3.4 | 2 |
| 1.0 | 3.4 | 7 |
| 2.0 | 3.4 | 14 |
| 3.0 | 3.4 | 20 |

[a] Measurements obtained on a Brookfield ® Viscometer at 12 RPM.

Data (viscosity-concentration) of a methacrylamidopropyltrimethylammonium chloride/acrylamide copolymer in hydrochloric acid solution is presented in Table V.

TABLE V
Rheological Properties of Acrylamide- MAPTAC Copolymer in Fresh and Acid Solutions

| Polymer Concentration (g/dl) | Acid Concentration (M) | Viscosity[a] (cps) |
|---|---|---|
| 0.5 | 0.0 | 20 |
| 1.0 | 0.0 | 40 |
| 2.0 | 0.0 | 210 |
| 3.0 | 0.0 | 965 |
| 0.5 | 2.74 | 15 |
| 1.0 | 2.74 | 30 |
| 2.0 | 2.74 | 130 |
| 3.0 | 2.74 | 540 |
| 0.5 | 8.22 | 10 |
| 1.0 | 8.22 | 22 |
| 2.0 | 8.22 | 105 |
| 3.0 | 8.22 | 430 |

[a] Measurements obtained on a Brookfield ® Viscometer at 12 RPM.

Again, we observe a decrease in viscosity as the acid concentration increases. The drop-off is not as dramatic as in Tables III and IV since the charge density on the methacrylamidopropyltrimethylammonium chloride/acrylamide copolymer (3.7 mole % MAPTAC) is less. In any event, the behavior of this material can also be contrasted with the terpolymer solution systems (Tables I and II).

The polymeric materials used in this study appear to be useful as a particular example of a general phenomena. That is, the presence of monomeric units comprising the broad class of water soluble anionic and cationic moieties within the polymer chain are the necessary requirements for viscosity enhancement in acid, base or salt solutions. A stoichiometric amount of these oppositely charged units is not a requirement for effective thickening of these latter solutions. For example, we have shown the viscosity of acid, base and salt solutions increase even with the complete absence of acrylamide in the polyampholyte structure. In addition, the acrylamide monomer units present within the terpolymer structure is only one example of many available water-soluble or water dispersible monomer structures.

What is claimed is:

1. A terpolymer having the formula:

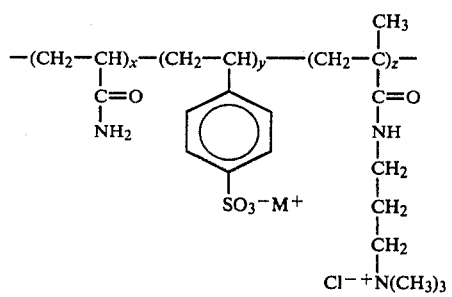

wherein x is about 40 to about 98 mole %, y is about 1 to about 50 mole %, z is about 1 to about 50 mole %, wherein y and z are less than 60 mole %, and M is selected from the group consisting of amines and a metallic cation being selected from the group consisting of lead, iron, aluminum, Groups IA, IIA, IB and IIB of the Periodic Table of Elements.

2. A terpolymer according to claim 1 wherein M is sodium.

3. A terpolymer according to claim 1 wherein said terpolymer is dissolved in an aqueous medium at a concentration of about 0.001 to 20 grams of terpolymer per 100 grams of water.

4. A terpolymer according to claim 1 wherein said terpolymer is dissolved in a salt solution at a concentration of about 0.001 to about 20 grams of terpolymer per 100 grams of water, said salt solution having about 0.001 to about 60 grams of salt per 100 grams of said salt solution.

5. A terpolymer according to claim 1 wherein said terpolymer is dissolved in an acid solution at a concentration of about 0.001 to about 20 grams of terpolymer per 100 grams of water, said acid solution having about 0.001 to about 30 grams of acid per 100 grams of said acid solution.

6. A terpolymer according to claim 1 wherein said terpolymer is dissolved in a base solution at a concentration of about 0.001 to about 20 grams of terpolymer per 100 grams of water, said base solution having about 0.001 to about 60 grams of base per 100 grams of said base solution.

7. A terpolymer according to claim 1 wherein said terpolymer possesses a nonstoichiometric amount of anionic and cationic groups.

8. A terpolymer according to claim 1 wherein said terpolymer is readily soluble or dispensible in fresh water.

9. A terpolymer according to claim 1 wherein said terpolymer possesses enhanced solvent thickening efficiency in acid, base, or salt solutions as compared to homogeneously charged copolymers.

10. A terpolymer according to claim 1 wherein said terpolymer is derived from water soluble nonionic, anionic and cationic monomers.

* * * * *